(12) United States Patent
Dartu et al.

(10) Patent No.: US 8,701,075 B2
(45) Date of Patent: *Apr. 15, 2014

(54) RECURSIVE HIERARCHICAL STATIC TIMING ANALYSIS

(71) Applicant: Synopsys, Inc., Mountain View, CA (US)

(72) Inventors: Florentin Dartu, Lake Owsego, OR (US); Patrick D. Fortner, Beaverton, OR (US); Kayhan Kucukcakar, Los Altos, CA (US); Qiuyang Wu, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,550

(22) Filed: Apr. 8, 2013

(65) Prior Publication Data

US 2013/0227507 A1   Aug. 29, 2013

Related U.S. Application Data

(63) Continuation of application No. 12/815,325, filed on Jun. 14, 2010, now Pat. No. 8,443,328.

(51) Int. Cl.
*G06F 17/50* (2006.01)
*G06F 9/455* (2006.01)

(52) U.S. Cl.
USPC ........... 716/134; 716/108; 716/112; 716/122; 716/136

(58) Field of Classification Search
USPC .......................... 716/108, 112, 122, 134, 136
See application file for complete search history.

(56) References Cited

U.S. PATENT DOCUMENTS

| | | | | |
|---|---|---|---|---|
| 5,831,869 A | * | 11/1998 | Ellis et al. | 716/103 |
| 7,249,334 B2 | * | 7/2007 | Nakashiba | 716/102 |
| 7,437,695 B1 | * | 10/2008 | Ranjan et al. | 716/113 |
| 2005/0229128 A1 | * | 10/2005 | Sripada | 716/6 |
| 2007/0168897 A1 | * | 7/2007 | Sripada | 716/6 |

* cited by examiner

*Primary Examiner* — Nghia Doan
(74) *Attorney, Agent, or Firm* — Fenwick & West LLP

(57) ABSTRACT

A method for recursive hierarchical static timing analysis. The method includes accessing a lower-level netlist representing a lower-level block of a circuit design to be realized in physical form, and accessing constraints for the lower-level block. Static timing analysis is performed on the lower-level block. The method includes accessing an upper-level netlist representing an upper-level block of the circuit design to be realized in physical form, and accessing constraints for the upper-level block. Static timing analysis is performed on the upper-level block while incorporating results from the static timing analysis on the lower-level block. Subsequently, recursive static timing analysis is performed on the lower-level block and the upper-level block, wherein results from static timing analysis on the upper-level block are feedback for updating the constraints for the lower-level block, and wherein results from static timing analysis on the lower-level block are feedback for updating the constraints for the upper-level block.

20 Claims, 7 Drawing Sheets

RECURSIVE HIERARCHICAL STATIC TIMING ANALYSIS

CROSS REFERENCE TO RELATED APPLICATIONS

This application is a continuation of U.S. patent application Ser. No. 12/815,325, titled "Recursive Hierarchical Static Timing Analysis" and filed on Jun. 14, 2010, which is incorporated by reference herein in its entirety.

FIELD OF THE INVENTION

The present invention is generally related to computer-aided design technology.

BACKGROUND OF THE INVENTION

The design and manufacture of modern high performance integrated circuit devices is a complex endeavor. To ensure a desired performance level is reached, computer aided design tools such as Static Timing Analysis (STA) are used. Generally, STA refers to certain methods of computing an expected timing of a digital circuit. STA is performed on a given design usually without requiring a full on simulation.

Operational clock frequency is the traditional manner in which high-performance integrated circuits have been characterized. Gauging the ability of a circuit to operate at the specified speed requires an ability to measure, during the design process, its delay at numerous steps. Moreover, delay calculation must be incorporated into the inner loop of timing optimizers at various phases of design, such as logic synthesis, layout (e.g., placement and routing), and in in-place optimizations performed late in the design cycle.

Although delay calculation timing measurements can theoretically be performed using a rigorous circuit simulation, such an approach is liable to be too slow to be practical. Static timing analysis plays a vital role in facilitating the fast and reasonably accurate measurement of circuit timing.

In a synchronous digital system, data is designed to move in lockstep, typically advancing one stage on each tick of the clock signal. Large designs often include a number of synchronizing elements, such as flip-flops or latches, which pass signals through their input to their output as controlled by, for example, the rising edge or falling edge of the clock signal.

A design for a synchronous digital system is primarily concerned with two kinds of timing errors. One is referred to as a hold time violation, when an input signal changes too quickly, after the clock's active transition. Another is referred to as a setup time violation, when a signal arrives too late, and misses the time when it should advance. The time when a signal arrives can vary due to many reasons. Such reasons include the fact that the input data may vary, the circuit may perform different operations, the temperature and voltage may change, there are manufacturing differences in the exact construction of each part, and the like. The objective of STA is to verify that despite these possible variations, all signals will arrive neither too early nor too late, and hence proper circuit operation can be assured. Also, since STA is capable of verifying every path, apart from helping locate setup and hold time violations, it can detect other serious problems like glitches, slow paths and clock skew.

Quite often, designers will want to qualify their design across many conditions. Behavior of an electronic circuit is often dependent on various factors in its environment like temperature or local voltage variations. In such a case either STA needs to be performed for more than one such set of conditions, or STA must be prepared to work with a range of possible delays for each component, as opposed to a single value. If the design works at each extreme condition, then under the assumption of monotonic behavior, the design is also qualified for all intermediate points.

A major trend within the field of integrated circuit design involves the use of hierarchical design techniques. Many companies utilize computer-aided design tools that employ hierarchical design techniques. Generally, hierarchical design refers to computer-aided design tools that divide a circuit netlist into a plurality of hierarchical blocks, where some blocks are more encompassing top-level blocks and other blocks or more low-level foundation blocks. There exist numerous motivations for hierarchical design, such as, the ability to allocate functional blocks to different engineering teams were different groups residing at different geographic locations. Other motivations include the ability to outsource engineering work for one or more blocks or reuse engineering work performed in designing a block in multiple subsequent designs.

As integrated circuit designs have become larger and larger, certain computer-aided design tools utilize models in order to quickly estimate the timing analysis of the constituent circuitry comprising a given block. Examples include ILMs (interface logic models) and ETMs (extracted timing models). The use of models functions by reducing the STA runtimes to more manageable levels (e.g., hours as opposed to days for some larger designs).

However, there are problems regarding the use of models in a hierarchical design flow. One problem involves the fact that the various functional blocks comprising a hierarchical design are allocated timing budgets. The timing budgets are intended to reflect the relative contribution of the timing of a particular block to the overall STA performance of the integrated circuit design. In practice, such budgets are difficult to establish accurately. Another problem involves the fact that it is difficult to manage and merge the timing constraints of lower-level blocks with the constraints of top-level blocks. For example, constraints of couple blocks are often particularly uncertain until the constraints of lower-level blocks have been firmly established.

The above problems lead to chip designers having a general lack of confidence in the STA results obtainable using hierarchical design flows. Managers are often unwilling to trust STA signoff (e.g., an assertion that the integrated circuit design meets its timing constraints) based on conventional hierarchical STA analysis. This outcome is typically a result of engineering experience, where there is little confidence the models actually represent the timing characteristics of the blocks comprising a design. One conventional solution is to simply flatten a hierarchical design such that it is represented as a single monolithic integrated circuit design (e.g., no blocks or modeling) and run conventional STA analysis on the flattened design. Once again, the problem with this solution is that as designs get larger, STA runtime can extend into several days and require very expensive computer systems. With no other options available, integrated circuit designers are often forced to pay this price.

SUMMARY OF THE INVENTION

Embodiments of the present invention implement a solution for hierarchical STA (static timing analysis) that can provide high degrees of accuracy and consistent in its results while executing STA runtimes much shorter than conventional flat STA runtimes. The accuracy and consistency of the results of hierarchical STA in accordance with embodiments of the present invention leads to a high degree of confidence in the STA results while reducing both the duration and physical memory requirement of the static timing analysis.

In one embodiment, the present invention comprises a computer implemented method for recursive hierarchical static timing analysis. The method includes accessing a lower-level netlist representing a lower-level block of a circuit design to be realized in physical form, and accessing constraints for the lower-level block. Static timing analysis is performed on the lower-level block. The method further includes accessing an upper-level netlist representing an upper-level block of the circuit design to be realized in physical form, and accessing constraints for the upper-level block. Static timing analysis is performed on the upper-level block while incorporating results from the static timing analysis on the lower-level block. Subsequently, recursive static timing analysis is performed on the lower-level block and the upper-level block, wherein results from static timing analysis on the upper-level block are feedback for updating the constraints for the lower-level block, and wherein results from static timing analysis on the lower-level block are feedback for updating the constraints for the upper-level block.

In one embodiment, the recursive static timing analysis on the lower-level block and the upper-level block is iterated at least until results from static timing analysis on the lower-level block and results from static timing analysis on the upper-level block are bounded.

In one embodiment, the accessing of constraints for the lower-level block includes accessing block level parasitic data for the low-level block.

In one embodiment, the accessing of constraints for lower-level block includes accessing interior block constraints and block boundary constraints.

In one embodiment, the accessing constraints for the upper-level block includes accessing upper-level parasitic data for the upper-level block.

In one embodiment, the accessing constraints for the upper-level block includes accessing upper-level constraints and block boundary constraints In one embodiment, the computer implemented method further includes selecting one of a plurality of different model abstraction levels for instantiating the lower-level block.

In one embodiment, the computer implemented method further includes selecting one of a plurality of different model abstraction levels for instantiating the upper-level block.

In one embodiment, the computer implemented method further includes performing design rule checking in conjunction with static timing analysis on both the lower-level block and the upper-level block.

In one embodiment, the computer implemented method further includes reporting violations of design rule checking criteria or static timing analysis criteria for both the lower-level block and the upper-level block.

In one embodiment, the present invention is implemented as a computer readable storage medium having stored thereon, computer executable instructions that, if executed by a computer system cause the computer system to perform a method for recursive hierarchical static timing analysis. The method includes accessing a lower-level netlist representing a lower-level block of a circuit design to be realized in physical form, and accessing constraints for the lower-level block. Static timing analysis is performed on the lower-level block. The method further includes accessing an upper-level netlist representing an upper-level block of the circuit design to be realized in physical form, and accessing constraints for the upper-level block. Static timing analysis is performed on the upper-level block while incorporating results from the static timing analysis on the lower-level block. Subsequently, recursive static timing analysis is performed on the lower-level block and the upper-level block, wherein results from static timing analysis on the upper-level block are feedback for updating the constraints for the lower-level block, and wherein results from static timing analysis on the lower-level block are feedback for updating the constraints for the upper-level block.

In one embodiment, the recursive static timing analysis on the lower-level block and the upper-level block is iterated at least until results from static timing analysis on the lower-level block and results from static timing analysis on the upper-level block are bounded.

In one embodiment, the accessing of constraints for the lower-level block includes accessing block level parasitic data for the low-level block and accessing interior block constraints and block boundary constraints.

In one embodiment, the accessing constraints for the upper-level block includes accessing upper-level parasitic data for the upper-level block and accessing upper-level constraints and block boundary constraints.

In one embodiment, the method further includes selecting one of a plurality of different model abstraction levels for instantiating the lower-level block, and selecting one of a plurality of different model abstraction levels for instantiating the upper-level block.

In one embodiment, the method further includes performing design rule checking in conjunction with static timing analysis on both the lower-level block and the upper-level block, and reporting violations of design rule checking criteria or static timing analysis criteria for both the lower-level block and the upper-level block.

In yet another embodiment, the present invention is implemented as a recursive hierarchical static timing analysis system. The system includes a computer system having a processor coupled to a computer readable storage media and executing computer readable code which causes the computer system to implement a recursive hierarchical static timing analysis module. The module accesses a lower-level netlist representing a lower-level block of the circuit design to be realized in physical form, and accesses constraints for the lower-level block. The module performs static timing analysis on the lower-level block. The module accesses an upper-level netlist representing an upper-level block of a circuit design to be realized in physical form, accesses constraints for the upper-level block, and performs static timing analysis on the upper-level block and incorporating results from the static timing analysis on the lower-level block. Additionally, the module performs recursive static timing analysis on the lower-level block and the upper-level block, wherein results from static timing analysis on the upper-level block are feedback for updating the constraints for the lower-level block, and wherein results from static timing analysis on the lower-level block are feedback for updating the constraints for the upper-level block.

In another embodiment, the accessing of constraints for the lower-level block includes accessing block level parasitic data for the low-level block and accessing interior block constraints and block boundary constraints.

In another embodiment, the accessing constraints for the upper-level block includes accessing upper-level parasitic data for the upper-level block and accessing upper-level constraints and block boundary constraints.

In another embodiment, the module selects one of a plurality of different model abstraction levels for instantiating the lower-level block, and selects one of a plurality of different model abstraction levels for instantiating the upper-level block.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
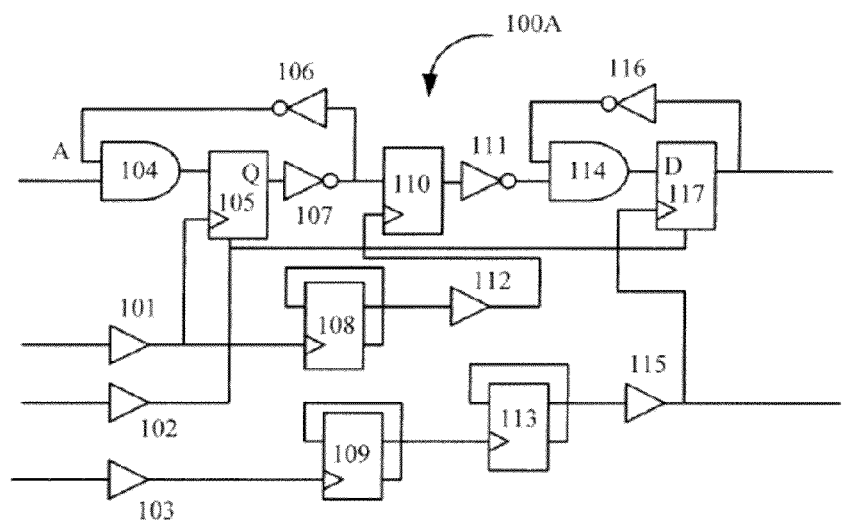
FIG. 1 shows an example gate-level netlist for an exemplary block in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "analyzing" or "storing" or "performing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement a solution for hierarchical STA (static timing analysis) that can provide high degrees of accuracy and consistency in its results while executing STA runtimes much shorter than conventional flat STA runtimes. The accuracy and consistency of the results of recursive hierarchical STA in accordance with embodiments of the present invention leads to a high degree of confidence in the STA results. The accurate and consistent results are provided without sacrificing STA runtime or requiring inordinately expensive computer systems. In this manner, embodiments of the present invention optimize the engineering processes regarding the use of models in a hierarchical design flow.

In a typical usage scenario, an embodiment comprises a computer implemented method for recursive hierarchical static timing analysis. The method includes accessing a lower-level netlist representing a lower-level block of a circuit design to be realized in physical form, and accessing constraints for the lower-level block. Static timing analysis is performed on the lower-level block. The method further includes accessing an upper-level netlist representing an upper-level block of the circuit design to be realized in physical form, and accessing constraints for the upper-level block.

Static timing analysis is performed on the upper-level block while incorporating results from the static timing analysis on the lower-level block. Subsequently, recursive static timing analysis is performed on the lower-level block and the upper-level block, wherein results from static timing analysis on the upper-level block are feedback for updating the constraints for the lower-level block, and wherein results from static timing analysis on the lower-level block are feedback for updating the constraints for the upper-level block.

As described above, the recursive hierarchical STA process produces accurate and consistent results. The results of the recursive hierarchical STA process are typically within 1% of the results obtainable via a conventional flat process. However, it should be noted that results can be obtained much faster than with the conventional flat STA process (e.g., 10× or greater). Additionally, as the size of integrated circuit designs continue to grow larger and larger, the benefits provided by the recursive hierarchical STA process of embodiments of the present invention grow progressively larger. This is especially so as flat designs approach the limits of the physical computer system required to process them (e.g., RAM capacity, CPU cycles, etc.).

FIGS. 1 and 2, and FIGS. 3 and 4 described below illustrate certain aspects of block level modeling as utilized in hierarchical design flows in accordance with embodiments of the present invention. Generally, hierarchical design refers to computer-aided design tools that divide a circuit netlist into a plurality of hierarchical blocks, where some blocks are more encompassing top-level blocks and other blocks or more low-level foundation blocks.

As described above, performing STA on large complex designs is becoming increasingly difficult. With hierarchical design flows, a large complex design can be divided into blocks, e.g., user or system defined hierarchies within a chip. At this point, the blocks can be replaced with timing models. Advantageously, timing models can provide a compact means of exchanging the interface timing information for the blocks. Some STA tools, such as the PrimeTime™ SI licensed by Synopsys, Inc., can automatically generate timing models from the gate-level netlist for a design.

The use of timing models in place of the full gate-level netlist for a block is key to improving performance and capacity associated with chip-level STA, particularly for large complex designs whose gate counts exceed 5 million gates, for example. Moreover, timing models can preserve information required to verify block integration in the design.

Automatic model generation can include the use of interface logic models (ILMs) and ETMs (extracted timing models). In a typical usage scenario, ILMs discard the netlist, constraints, and back-annotation associated with internal register-to-register paths on a design, thereby offering significant runtime and performance improvements without sacrificing accuracy. Moreover, an ILM contains only interface logic of the original netlist. For example, logic that is only contained in register-to-register paths on a block is not placed in an ILM.

In one embodiment, the following interface logic can be defined as belonging to an ILM.

(1) Cells (i.e. combinational logic and associated nets (called interface nets herein)) contained in a timing path that starts at an input port and ends at either an edge-triggered register (i.e. sequential logic) or an output port. If a transparent latch is encountered in such a timing path, then it is treated as combinational logic and path tracing continues through the latch until an edge-triggered register or output port is encountered.

(2) Cells contained in a timing path that starts at an edge-triggered register and ends at an output port. Encountered transparent latches are handled as described in (1).

(3) Clock trees driving edge-triggered registers in the ILM.

Figure 2:
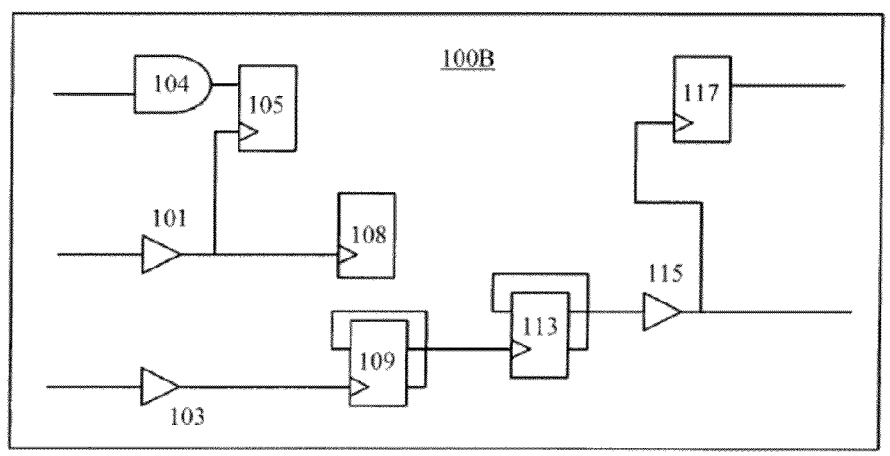
FIG. 2 illustrates the interface logic model (ILM) of a netlist in accordance with one embodiment of the present invention.

FIG. 1 shows an example gate-level netlist 100A for an exemplary block, and FIG. 2 illustrates the interface logic model (ILM) 100B of netlist 100A. In the present embodiment, note that inverters 106, 107, 111, 116, buffer 112, edge-triggered register 110, and AND gate 114 are only instantiated in register-to-register paths and therefore are not part of ILM 100B. In contrast, AND gate 104, and edge-triggered register 105 are part of ILM 100B because they are contained in a timing path starting at an input port of the block and ending at edge-triggered register 105. It should be noted that in ILM 100B, the input terminal A of AND gate 104 and the Q output terminal on edge-triggered register 105, both of which belong to a register-to-register paths, are disconnected.

Edge-triggered register 117 is contained in a timing path and ends at an output port and therefore is part of ILM 100B. Note that the D input terminal on edge-triggered register cell 117 belongs to a register-to-register path and therefore is disconnected in ILM 100B.

Buffer 102 is not part of a timing path and therefore is not part of ILM 100B. In contrast, buffers 101 and edge-triggered registers 108 and 109 are part of ILM 100B because they are in the clock tree. Buffer 115 and an edge-triggered register 113 are part of ILM 100B because they are contained in a timing path starting at edge-triggered register 113 and ending at an output port of the block (buffer 115 and edge-triggered register 113 are also part of the clock tree driving edge-triggered register 117). Note that the feedback paths of edge-triggered registers 109 and 113 as well as the internal net between edge-triggered registers 109 and 113 are part of the clock tree that ultimately drives the clock of edge-triggered register 117 and therefore are included in ILM 100B. Further note that the net driving the clock terminal of edge-triggered register 117 is included as part of the clock tree driving an edge-triggered register forming part of ILM 100B.

In one embodiment, for designs including transparent latches, the maximum number of levels of latch "borrowing" in I/O paths can be specified. A latch is defined to be borrowing if the data signal of the latch comes in the transparency window of the latch. By default, transparent latches can be viewed substantially as combinational logic. That is, the fanout or fanin traversal continues through a transparent latch until an edge-triggered register is encountered. When the number of levels of latch borrowing is specified, the fanout or fanin traversal instead stops at a transparent latch whose level is greater than the specified borrowing level. Thus, specifying one level of latch borrowing, for example, results in the first two transparent latches encountered in an I/O path being part of the ILM. The first transparent latch can borrow, while the second transparent latch can function as an edge-triggered register that does not borrow.

Thus, as shown with respect to netlist 100A and ILM 100B, the internal nets (i.e. nets other than interface nets) of the block are eliminated. Notably, the elimination of these internal nets may cause failures or even loss of performance inside the block, in other blocks, or in the top-level design. For example, when global routing is performed for circuits in the design, the proximity of a global net external to the block and an internal net could result in cross-coupling that leads to undesirable effects like crosstalk (e.g., a signal on one net affecting the speed of the signal on the other net), thereby affecting the timing of one or both nets. Note that crosstalk can also affect two nets in different, proximate blocks.

Figure 3:
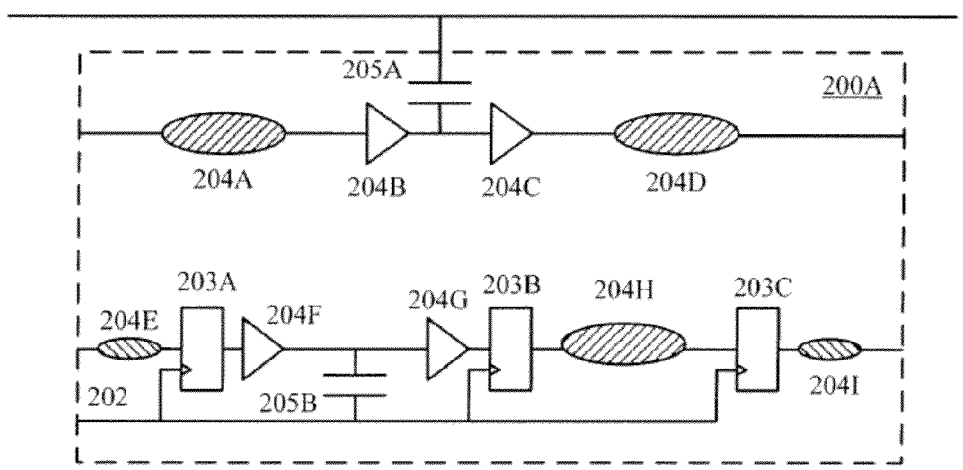
FIG. 3 illustrates a gate-level netlist for an exemplary block having a top-level net in accordance with one embodiment of the present invention.

FIG. 3 illustrates a gate-level netlist 200A for an exemplary block having a top-level net 201. It should be noted that netlist 200A includes both edge-triggered registers 203A-203C and combinational logic 204A-204I. Cross-coupling between an internal net in the exemplary block to top-level net 201 is identified by a capacitor 205A. Similarly, cross-coupling between another internal net in the block to an interface net 202 is identified by a capacitor 205B. In one embodiment, cross-coupling can be identified based on the proximity of the two nets, the shape of the routes, the power and ground rails, and the materials.

Figure 4:
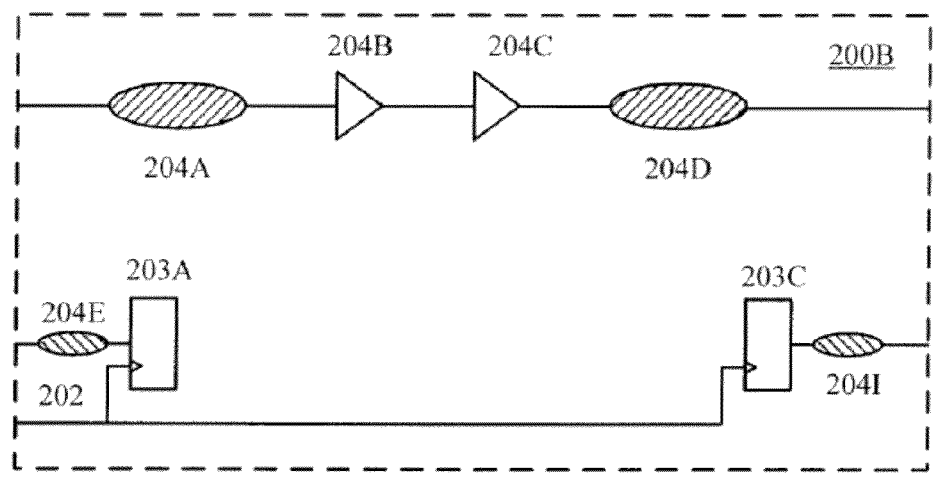
FIG. 4 illustrates an ILM for a netlist in accordance with the above-described rules and in accordance with one embodiment of the present invention.

FIG. 4 illustrates an ILM 200B for netlist 200A in accordance with the above-described rules. Note that combinational logic 204A-204D are contained in a timing path that starts at an input port and ends at an output port and therefore are included in ILM 200B. Combinational logic 204E and edge-triggered register 203A are contained in a timing path starting at an input port and ending at edge-triggered register 203A and therefore are also included in ILM 200B. Combinational logic 204I and an edge-triggered register 203C are contained in a timing path starting at edge-triggered register 203C and ending at an output port and therefore are also included in ILM 200B.

Thus, as described above, timing models can be used extensively in place of the full gate-level netlist for a block. These substitutions are highly useful for improving performance and capacity associated with chip-level STA, particularly for large complex designs whose gate counts exceed 5 million gates, for example.

Figure 5:
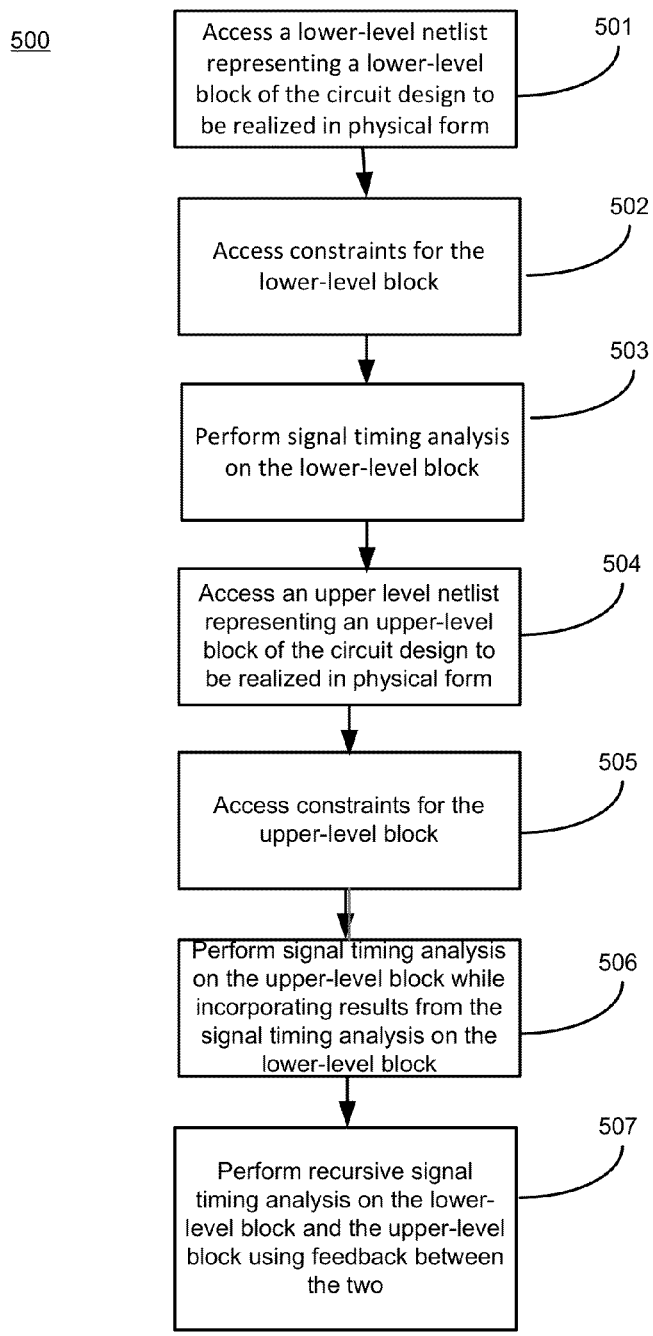
FIG. 5 shows a flowchart depicting a recursive hierarchical STA process in accordance with one embodiment of the present invention.

FIG. 5 shows a flowchart depicting a recursive hierarchical STA process 500 in accordance with one embodiment of the present invention. As depicted in FIG. 5, process 500 shows the general operating steps of a recursive hierarchical STA process as implemented by one embodiment of the present invention.

Process 500 begins in step 501, where an STA process in accordance with one embodiment of the present invention accesses a lower-level netlist representing a lower-level block (e.g., or perhaps many such low-level blocks) of a circuit design to be realized in physical form. As described above, large complex integrated circuit designs are increasingly being created as hierarchical multiple block designs. These blocks are accessed via their netlist definitions. In step 502, process 500 accesses constraints for the lower-level block. These constraints can be included as part of the netlist (e.g., metadata) or can be accessed via a separate file maintained in a separate library. Subsequently, in step 503, static timing analysis is performed on the lower-level block.

In step 504, process 500 accesses an upper-level netlist representing an upper-level block of the circuit design to be realized in physical form. This upper-level netlist can be, for example a top-level block that includes interface logic and glue logic for holding together the one or more lower-level blocks. In step 505, process 500 accesses constraints for the upper-level block. In step 506, static timing analysis is performed on the upper-level block. The static timing analysis incorporates the results from the static timing analysis on the lower-level block(s).

Subsequently, in step 507, recursive static timing analysis is performed on the lower-level block and the upper-level block. As described above, the recursive static timing analysis functions wherein results from static timing analysis on the upper-level block are used as feedback for updating the constraints for the lower-level block, and similarly wherein results from static timing analysis on the lower-level block are used as feedback for updating the constraints for the upper-level block. In this manner, the low-level block STA updates its constraints regarding its timing requirements. These updated constraints and timing requirements are used by high-level block in computing its STA updates and constraints. The cycle continues recursively, as the updated high-level block's STA feedback improves the results of the low-level block's STA, and the low-level block's STA feedback improves the results of the high-level block's STA.

As described above, the recursive hierarchical STA process produces accurate and consistent results. The results of the recursive hierarchical STA process are typically within 1% of the results obtainable via a conventional flat process. However, it should be noted that results were obtained much faster than with the conventional flat STA process (e.g., 10× or greater). Additionally, with the increasing large integrated circuit designs, the benefits provided by the recursive hierarchical STA process of embodiments of the present invention grow progressively larger, as flat designs approach the limits of the physical computer system (e.g., RAM capacity, CPU cycles, etc.). Additionally, it should be noted that in one embodiment, the process can provide a user selectable option for not updating lower block constraints from the upper block. In one embodiment, the process enables a user to define parent of each upper or lower block in the hierarchy so that the user can choose to analyze lower block once for all instantiations of it or have multiple analyses for the multiple instantiations.

It should be noted that the process 500 embodiment described above depicts the context of an upper-level block undergoing STA processing along with a lower-level block. However, it should be understood that hierarchical STA processing in accordance with embodiments of the present invention can be implemented in scenarios where the hierarchical relationships between multiple blocks are much more extensive. For example, STA processing can be implemented between a top-level block, multiple second-level blocks, which build upon even more third level blocks, and so on. In such scenarios, multilevel recursion between the blocks at different levels of the hierarchy can be implemented whereby, for example, a given block updates both the block(s) above itself in the hierarchy and the block(s) below. Similarly, the given block receives updates from both the block(s) above itself in the hierarchy and the block(s) below.

It should be noted that, in one embodiment, hierarchical STA processing checks the sufficiency of lower block constraints for signoff (e.g., where an engineer or manager certifies a design meets requirements and is complete). To accomplish this, a sufficient amount of constraints should be defined at the block level so that a given block can be signed off safely if an upper block uses it within range. Examples of such bounding constraints are input/output delays, input/output transition times, best/worst case drivers, best/worst case coupling to outside the lower block, etc.

In one embodiment, at any level of the multi-level hierarchical design, after and in addition to performing static timing analysis, the STA processing can generate accurate and updated block boundary constraints and design constraints. The updated constraints are used to guide and aid other CAD tools in performing necessary circuit changes (e.g., ECO's) in order to achieve optimal design quality, such as timing, power, noise, area, manufacturability, etc.

In one embodiment, for circuit optimization changes, design constraints changes and/or other environmental changes, all the effects are automatically propagated and accounted for throughout the chip to the necessary parts of the design via updated block boundary constraints and block models. This mechanism increases the optimizable size of the circuit in consideration of global metrics and environments for the entire chip.

Figure 6:
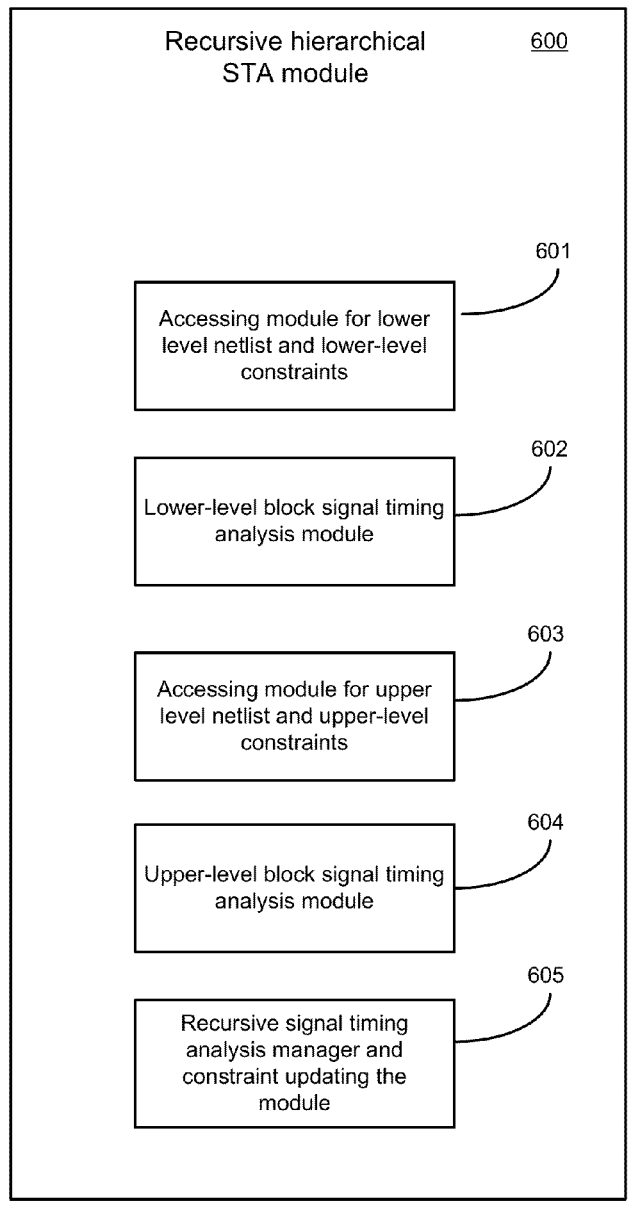
FIG. 6 shows a diagram depicting exemplary software-based instantiations of modules that implement the functionality of the recursive hierarchical STA process of embodiments of the present invention.

FIG. 6 shows a diagram depicting exemplary software-based instantiations of modules that implement the functionality of the recursive hierarchical STA process of embodiments of the present invention. As depicted in FIG. 6, the functionality of embodiments of the present invention is implemented through a software-based recursive hierarchical STA module 600. The module 600 includes five constituent modules 601-605.

The module 601 functions as an accessing module for the lower-level netlist and lower-level constraints for the lower-level blocks. Module 602 functions as a low-level block static timing analysis module. Module 603 functions as an accessing module for the upper-level netlist and upper-level constraints for the upper-level blocks. Module 604 functions as the upper-level block static timing analysis module. The module 605, functions as the recursive static timing analysis manager and the constraints updating module. The module 605 is responsible for updating the feedback mechanisms during the recursive article STA processing that occurs between the upper-level blocks and a lower-level blocks.

Figure 7:
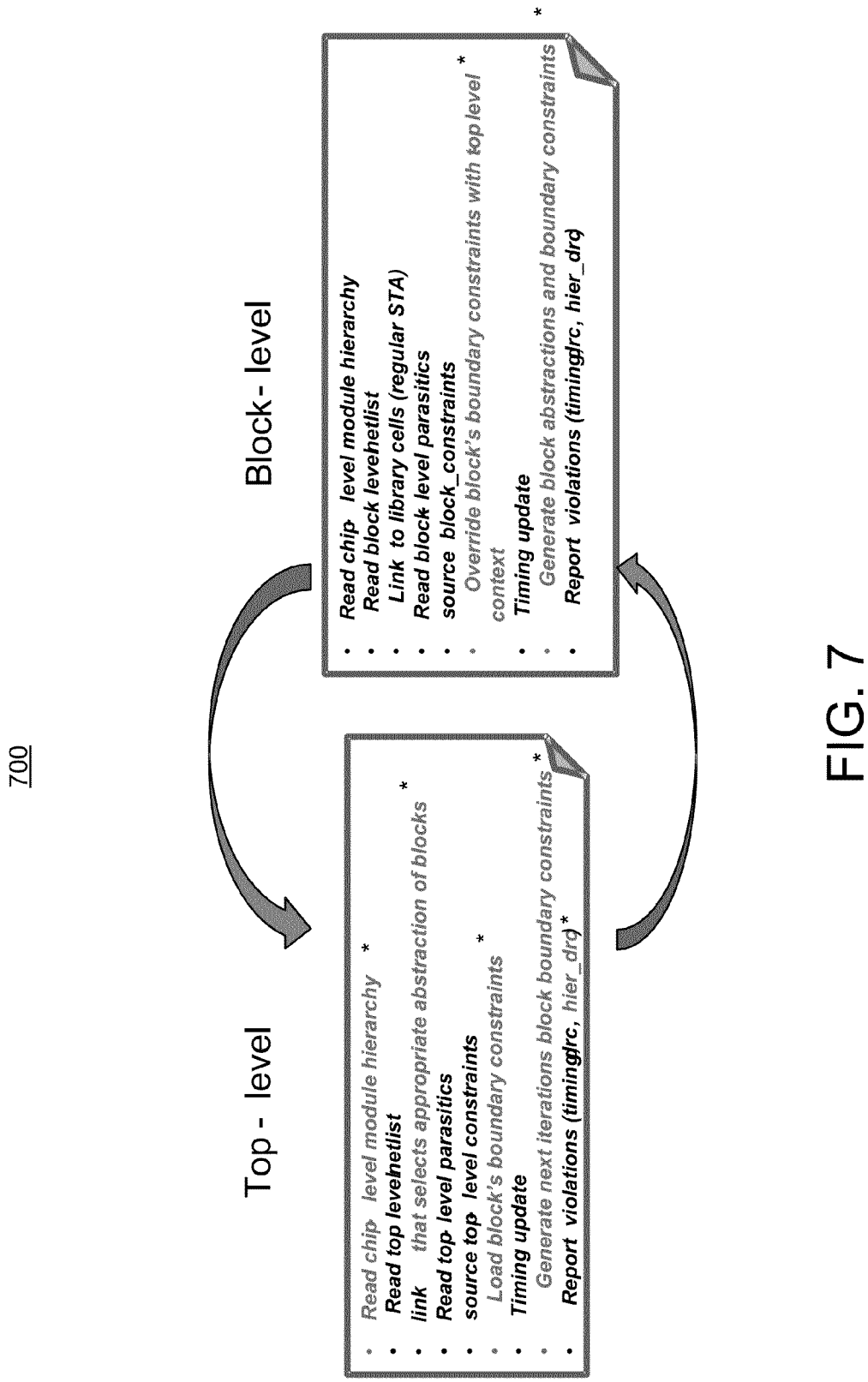
FIG. 7 shows a more detailed flow diagram of a recursive hierarchical STA process in accordance with one embodiment of the present invention.

FIG. 7 shows a more detailed flow diagram of a recursive hierarchical STA process 700 in accordance with one embodiment of the present invention. As depicted in FIG. 7, process 700 shows more detailed steps that we can be used to implement the recursive feedback between upper-level blocks and lower-level blocks used by embodiments of the present invention.

The FIG. 7 embodiment is substantially similar to the flowchart of process 500 of FIG. 5 above. However, in the FIG. 7 embodiment, additional details are illustrated showing functionality that can be implemented to provide certain features. For example, as described above in the discussion of FIG. 5, STA analysis on the low-level block begins with reading in the block level netlist. Process 700 shows additional details whereby a chip level module hierarchy is read for the low-level block, along with linking to library cells to support STA processing. Reading block level parasitics (e.g., parasitic capacitance loads, etc.) and source block constraints provides additional details with regard to the step of accessing constraints for the low-level block.

Steps that are recursively updated via the feedback mechanisms described above are indicated by asterisks. For example, with the low-level block, the overriding of the block's boundary constraints with top-level context occurs via the feedback from the top-level STA processing. Similarly, the generating of block abstractions and boundary constraints are updates based upon the new context information from the top-level block.

Referring to the top-level block on the left-hand side of FIG. 7, the reading of the chip level module hierarchy, selecting the appropriate abstractions blocks, loading top-level block's boundary constraints, and generating the next iteration's block boundary constraints are steps that are recursively updated via the feedback mechanism from running the STA processing on the lower-level block. It should be noted that with both the upper-level block and the lower-level block, violations for design rule checking, timing checking, and the like can be logged and reported.

It should be noted that hierarchical design rule checking, depicted as "hier_drc" in FIG. 7, refers to the fact that each mechanism to effect the results of hierarchical STA needs to be the same between the upper block and lower block. For example, each lower block is used in upper block within its validated range. Some key constraints of a lower level block should be the same at the upper level block. For example, a "clock a" on the lower block's "port c" should have the same frequency as the clock propagated at the upper clock to the "port c" of lower block.

Figure 8:
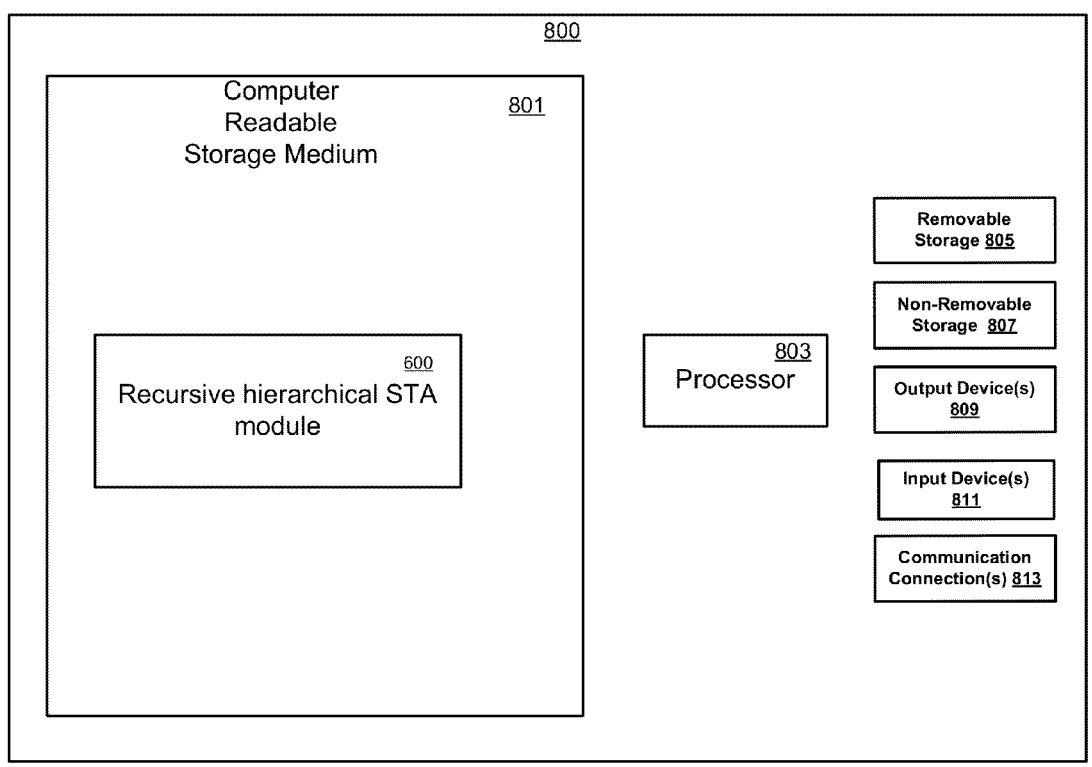
FIG. 8 shows an exemplary computer system according to one embodiment of the present invention.

FIG. 8 shows an exemplary computer system 800 according to one embodiment. Computer system 800 depicts the components of a basic computer system providing the execution environment for certain hardware-based and software-based functionality for the above described embodiments. For example, computer system 800 can be a system upon which the volume device manager 530 and one or more software stacks from FIG. 6 are instantiated. Computer system 800 can be implemented as, for example, a server computer system, workstation computer system, desktop computer system, or laptop computer system. Similarly, computer system 800 can be implemented as a handheld device. Computer system 800 typically includes at least some form of computer readable media (e.g., computer readable storage medium 801). Computer readable media can be a number of different types of available media that can be accessed by computer system 800 and can include, but is not limited to, computer storage media.

In its most basic configuration, computer system 800 typically includes processing unit 803 and a computer readable storage medium 801. Depending on the exact configuration and type of computer system 800 that is used, memory 801 can be volatile (e.g., such as DRAM, etc.), non-volatile (e.g., such as ROM, flash memory, etc.) or some combination of the two. Similarly, the memory 801 can comprise other devices besides solid-state devices, such as, for example, magnetic disk-based media, optical media, or the like.

Additionally, computer system 800 can include other mass storage systems (e.g., removable 805 and/or non-removable 807) such as magnetic or optical disks or tape. Similarly, computer system 800 can include input devices 811 and/or output devices 809 (e.g., such as a display). Computer system 800 can further include communication connections 813 to other devices, computers, networks, servers, etc. using either wired or wireless media. As all of these devices are well known in the art, they need not be discussed in detail.

It should further be noted, that the computer system 800 can have some, most, or all of its functionality supplanted by a distributed computer system having a large number of dispersed computing nodes, such as would be the case where the functionality of the computer system 800 is partly or wholly executed using a cloud computing environment.

Figure 9:
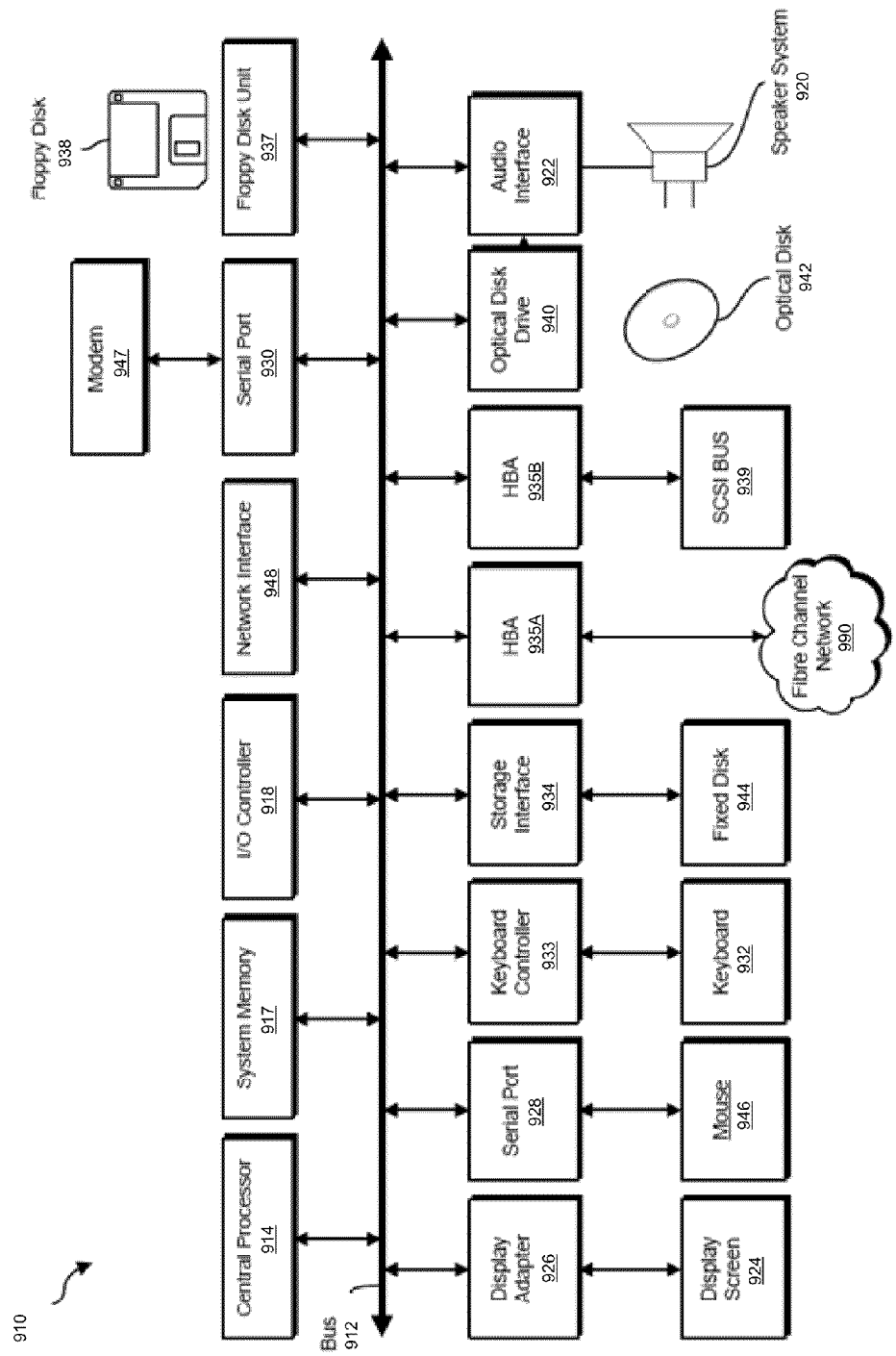
FIG. 9 depicts a block diagram of a computer system suitable for implementing certain functionality in accordance with one embodiment of the present invention.

FIG. 9 depicts a block diagram of a computer system 910 suitable for implementing certain functionality in accordance with one embodiment of the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fiber Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. In the FIG. 9 embodiment, the system memory 917 instantiates a replication manager module 950 which implements the continuous replication functionality described above. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for recursive hierarchical static timing analysis, comprising:
   accessing a lower-level netlist representing a lower-level block of a circuit design to be realized in physical form;
   accessing constraints for the lower-level block;
   performing static timing analysis on the lower-level block;
   accessing an upper-level netlist representing an upper-level block of the circuit design to be realized in physical form;
   accessing constraints for the upper-level block;
   performing static timing analysis on the upper-level block while incorporating results from the static timing analysis on the lower-level block; and
   performing, by a computer, recursive static timing analysis on the lower-level block and the upper-level block, the recursive static timing analysis using results from static timing analysis on the upper-level block as feedback for updating the constraints for the lower-level block, and the recursive static timing analysis using results from static timing analysis on the lower-level block as feedback for updating the constraints for the upper-level block.

2. The method of claim 1, wherein the recursive static timing analysis on the lower-level block and the upper-level block is iterated at least until results from static timing analysis on the lower-level block and results from static timing analysis on the upper-level block are bounded.

3. The method of claim 1, wherein accessing constraints for the lower-level block includes accessing block level parasitic data for the low-level block.

4. The method of claim 1, wherein accessing constraints for the lower-level block includes accessing interior block constraints and block boundary constraints.

5. The method of claim 1, wherein accessing constraints for the upper-level block includes accessing upper-level parasitic data for the upper-level block.

6. The method of claim 1, wherein accessing constraints for the upper-level block includes accessing upper-level constraints and block boundary constraints.

7. The method of claim 1, further comprising:
   selecting one of a plurality of different model abstraction levels for instantiating the lower-level block.

8. The method of claim 1, further comprising:
   selecting one of a plurality of different model abstraction levels for instantiating the upper-level block.

9. The method of claim 1, further comprising:
   providing a user selectable option for updating the lower level block constraints independent of the feedback from the upper level block.

10. The method of claim 1, wherein the recursive static timing analysis is performed on the lower-level block, the upper-level block, and an additional block of the circuit design that is at a different hierarchical level than the lower level block and the upper level block.

11. A non-transitory computer readable storage medium storing computer executable instructions for recursive hierarchical static timing analysis that, if executed by a computer system cause the computer system to perform a method comprising:
- accessing a lower-level netlist representing a lower-level block of a circuit design to be realized in physical form;
- accessing constraints for the lower-level block;
- performing static timing analysis on the lower-level block;
- accessing an upper-level netlist representing an upper-level block of the circuit design to be realized in physical form;
- accessing constraints for the upper-level block;
- performing static timing analysis on the upper-level block while incorporating results from the static timing analysis on the lower-level block; and
- performing recursive static timing analysis on the lower-level block and the upper-level block, the recursive static timing analysis using results from static timing analysis on the upper-level block as feedback for updating the constraints for the lower-level block, and the recursive static timing analysis using results from static timing analysis on the lower-level block as feedback for updating the constraints for the upper-level block.

12. The non-transitory computer readable storage medium of claim 11, wherein the recursive static timing analysis on the lower-level block and the upper-level block is iterated at least until results from static timing analysis on the lower-level block and results from static timing analysis on the upper-level block are bounded.

13. The non-transitory computer readable storage medium of claim 11, wherein accessing constraints for the lower-level block includes accessing block level parasitic data for the low-level block.

14. The non-transitory computer readable storage medium of claim 11, wherein accessing constraints for the lower-level block includes accessing interior block constraints and block boundary constraints.

15. The non-transitory computer readable storage medium of claim 11, wherein accessing constraints for the upper-level block includes accessing upper-level parasitic data for the upper-level block.

16. The non-transitory computer readable storage medium of claim 11, wherein accessing constraints for the upper-level block includes accessing upper-level constraints and block boundary constraints.

17. The non-transitory computer readable storage medium of claim 11, wherein the method further comprises:
- selecting one of a plurality of different model abstraction levels for instantiating the lower-level block.

18. The non-transitory computer readable storage medium of claim 11, wherein the method further comprises:
- selecting one of a plurality of different model abstraction levels for instantiating the upper-level block.

19. The non-transitory computer readable storage medium of claim 11, wherein the method further comprises:
- providing a user selectable option for updating the lower level block constraints independent of the feedback from the upper level block.

20. The non-transitory computer readable storage medium of claim 11, wherein the recursive static timing analysis is performed on the lower-level block, the upper-level block, and an additional block of the circuit design that is at a different hierarchical level than the lower level block and the upper level block.

* * * * *